United States Patent [19]

Wiley

[11] Patent Number: 4,626,861

[45] Date of Patent: Dec. 2, 1986

[54] TWO ANGLE RANGE AND ALTITUDE MEASUREMENT SYSTEM AND METHODS

[75] Inventor: Edward R. Wiley, Mercer Island, Wash.

[73] Assignee: The Boeing Company, Seattle, Wash.

[21] Appl. No.: 655,705

[22] Filed: Sep. 28, 1984

[51] Int. Cl.⁴ ............................ G01S 3/02; G01S 5/02
[52] U.S. Cl. ..................................... 342/458; 342/462; 342/430; 342/458; 364/449
[58] Field of Search ............... 343/450, 453, 458, 462, 343/465, 11 VB, 387, 428, 430; 364/449, 458

[56] References Cited

U.S. PATENT DOCUMENTS

| | | |
|---|---|---|
| 2,415,094 | 2/1947 | Hansen et al. |
| 2,646,563 | 7/1953 | Stabler . |
| 3,078,459 | 2/1963 | Vadus et al. |
| 3,154,783 | 10/1964 | Kerdock . |
| 3,182,328 | 5/1965 | Hings . |
| 3,210,762 | 10/1965 | Brabant . |
| 3,242,491 | 3/1966 | Winter . |
| 3,267,469 | 8/1966 | Vadus . |
| 3,328,565 | 6/1967 | Prichodjko . |
| 3,337,869 | 8/1967 | Bernstein et al. |
| 3,398,268 | 8/1968 | Prichodjko et al. |
| 3,696,418 | 10/1972 | Litchford . |
| 4,268,167 | 5/1981 | Alderman . |
| 4,339,755 | 7/1982 | Wright . |

Primary Examiner—Theodore M. Blum
Assistant Examiner—Gregory C. Issing
Attorney, Agent, or Firm—Finnegan, Henderson, Farabow, Garrett & Dunner

[57] ABSTRACT

A passive system and related methods for detecting range and/or elevation of a target by using an X beam antenna system and by measuring the time delay between receipt of signals in the two planes of the X beam which are received directly from the target and by measuring the time delay between receipt of signals in the two planes of the X beam which signals are emitted by the target but reflected from a remote surface. By knowing these two time delays, the height of the antenna system, the fixed angle between the two planes of the X beam and the rate of rotation of the X beam, a direct calculation is established to determine the range and/or elevation of the target.

10 Claims, 12 Drawing Figures

TWO ANGLE RANGE AND ALTITUDE MEASUREMENT SYSTEM AND METHODS

BACKGROUND OF THE INVENTION

I. Field of the Invention

The present invention relates to a passive system and corresponding methods for efficiently and economically determining real time range and/or altitude of a signal emitting target.

II. Description of the Prior Art

Passive surveilance systems are known which can identify the bearing or azimuth of a target by simply rotating a receiving antenna and determining the azimuth angle of that antenna upon receipt of a signal transmitted by the target. In order to effectively utilize such target azimuth information, additional target identification data, such as range or altitude, must be associated or fused with the azimuth information.

Passive systems are known which can provide range and/or altitude information. For example, a Passive Ranging on Non-Scanning Emitters (PRONSE) system is known which requires two or more widely separated sensors such as sensors on each wing tip of a system carrying aircraft. In the PRONSE system, it is necessary to know the location and altitude of each sensor with respect to the other with a great degree of precision. The flexibility of large aircraft structures mandates the use of auxiliary locating systems, such as inertial or laser systems, to track the relative movement of the sensors.

Another type of system capable of identifying range and/or altitude is known as a Time Delay of Arrival (TDOA) system in which a receiver calculates the difference in transit time between a signal received directly from a target and that signal received as a reflected wave. In addition, the receiver determines the depression angle of the directly received signal and/or reflected signal by measuring the physical position of the antenna at the time of receipt. Such systems have a substantial disadvantage of introducing significant error due to the inability to accurately measure the depression angle by measuring the angle of the receiver antenna.

A single platform passive ranging system using altitude comparison is also known today. However, this system requires a detailed knowledge of emitter power characteristic and relies upon the assumption that the strength of the recorded signal from the target is indicative of the range of that target. This system is not reliable due to the fact that emitters are seldom adjusted for maximum operational performance, and atmospheric anomolies can significantly alter the received signal amplitude.

In view of the foregoing, it is an object of the subject invention to provide a passive surveillance system and related methods whereby range and/or altitude can be readily obtained for fusion with other data such as azimuth angle data.

Another object of the subject invention is to provide a system and related methods for determining real time range and/or altitude using hardware and software which is less costly than that presently required.

A still further object of the present invention is to provide a single platform passive ranging system and related methods, which will work for all signal emitting targets, including jammers, but yet which are affordable and technically feasible.

Additional objects and advantages of the invention will be set forth in the description which follows, and in part will be obvious from the description or may be learned by practice of the invention. The objects and advantages of the invention may be realized and obtained by means of the instrumentalities and combinations particularly pointed out in the appended claims.

SUMMARY OF THE INVENTION

In accordance with the foregoing objects, and in accordance with the purposes of the invention as embodied and broadly described herein, a passive system and related methods for detecting the range and elevation of a target are provided. This system comprises: an antenna system having first and second planes of receipt which are inclined a fixed angle ($\theta$) from one another, the antenna system being located along the line of intersection of the planes and the antenna system including means for sweeping the line of interesection at a known rate of sweep ($\tau$); means for measuring the delay ($T_1$) between receipt of signals in the first and then in the second planes which are emitted from a target and received directly by the antenna system; means for measuring the delay ($T_2$) between receipt of signals in the first and then in the second planes which are emitted by the target and received by the antenna system after being reflected from a remote surface; means for measuring the height ($R_H$) of the antenna system; and means for calculating the range and/or elevation of the target in response to $\theta$, $\tau$, $T_1$, $T_2$ and $R_H$.

Preferably, the means for calculating determines slant target range $R_S$ using the relationship:

$$R_S = \frac{2R_H \cdot \cos(\alpha_G)}{\sin(\alpha_G + \alpha_D)};$$

where:

$$\alpha_D = \tan^{-1}[\sin(T_1 \cdot \tau)/\tan(\theta)];$$

and $$\alpha_G = \tan^{-1}[\sin(T_2 \cdot \tau)/\tan(\theta)].$$

Moreover, the means for calculating preferably determines target elevation $T_H$ using the relationship:

$$T_H = R_H - R_S \sin(\alpha_D)$$

BRIEF DESCRIPTION OF THE DRAWINGS

The accompanying drawings, which are incorporated in and constitute a part of the specification, illustrate a preferred embodiment of the invention and, together with the general description of the invention given above, and a detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

The system and methods of the subject invention are based on the idea of measuring the depression angle ($\alpha_D$) of a signal which arrives directly from a target and also measuring the depression angle ($\alpha_G$) of a signal from that target which is reflected from a remote surface such as the ground. By using these two angles, a direct non-ambiguous determination can be made of both the range and altitude of the target which can be fused with otherwise determined target azimuth information.

However, the use of any system dependent upon depression angles requires extremely accurate measurement of those angles. Direct physical measurement of such angles by measuring the orientation of the receiving antenna is not practical for an airborne system due in part to physical limitations in making such measurements accurate enough, and due in part to the limited vertical aperture permitted in an airborne environment.

Instead of using physical antenna orientation measurement for direct and ground bounced depression angles, the subject invention relies upon an indirect evaluation of those angles through utilization of a time measurement system. Since only time and not any physical quantity is being measured, the subject system and related methods are readily adaptable to airborne environments.

More specifically, in the subject invention a receiver is employed which has an antenna system capable of developing first and second planes of receipt, with these planes being inclined a fixed angle $\theta$ from one another. These first and second planes intersect one another along a line of intersection, and the antenna system of the receiver is located along this line of intersection. The antenna system includes a device for sweeping or rotating the line of intersection and therefore the planes at a known rate of sweep. This type of antenna system is generically known as an "X" or "V" beam system. As used herein, the term "receiver" is a generic term which includes both an antenna mechanism and an active electronic mechanism which can convert signals collected by the antenna into readily utilizable form. Accordingly, the receiver may be located along the line of intersection of the planes in the sense that the antenna system of the receiver is so located, although obviously the active electronic portion may be located in a position remote from the antenna portion.

Moreover, the term "depression angle" is to be considered synonymous with the term "elevation angle." Accordingly, a "depression angle" may relate to either a target below the line of intersection or a target above this line. The principle, theory and coverage of the subject invention is intended to include both cases, even though for convenience only the term "depression angle" is employed.

Figure 1:
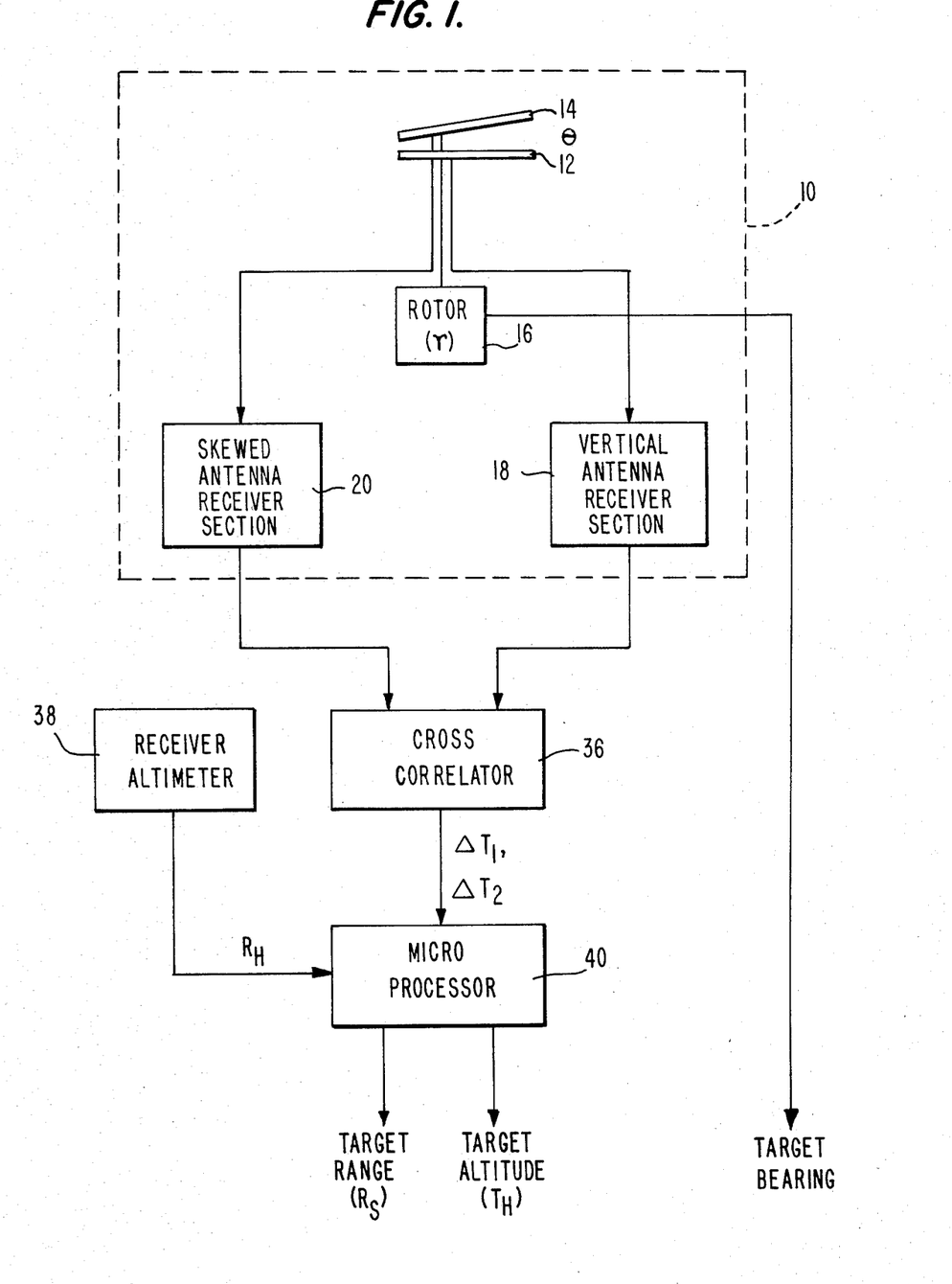
FIG. 1 is a block diagram of a system incorporating the teachings of the present invention.

In FIG. 1 there is illustrated a block diagram of a system employing the teachings of the subject invention. Depicted in FIG. 1 is a receiver 10 which includes antennas 12 and 14, rotor 16, vertical antenna receiver section 18, and skewed antenna receiver section 20. Antennas 12 and 14 produce a receiving fan beam which is planar in the sense that the beam is very narrow in one dimension and very wide in the other. Such antennas are known in the art as "azimuth only" antennas. Antenna 12 is illustrated in FIG. 1 as being physically oriented horizontally which produces a vertical planar beam. Although a vertical orientation is not critical, such orientation is preferred. Antenna 14 is illustrated in FIG. 1 as being set at a fixed angle $\theta$ in comparison to antenna 12 and, therefore, produces a planar fan beam which is offset at angle $\theta$ from the planar fan beam produced by antenna 12. Angle $\theta$ is preferably within the range of 5 to 30 degrees.

Figure 2:
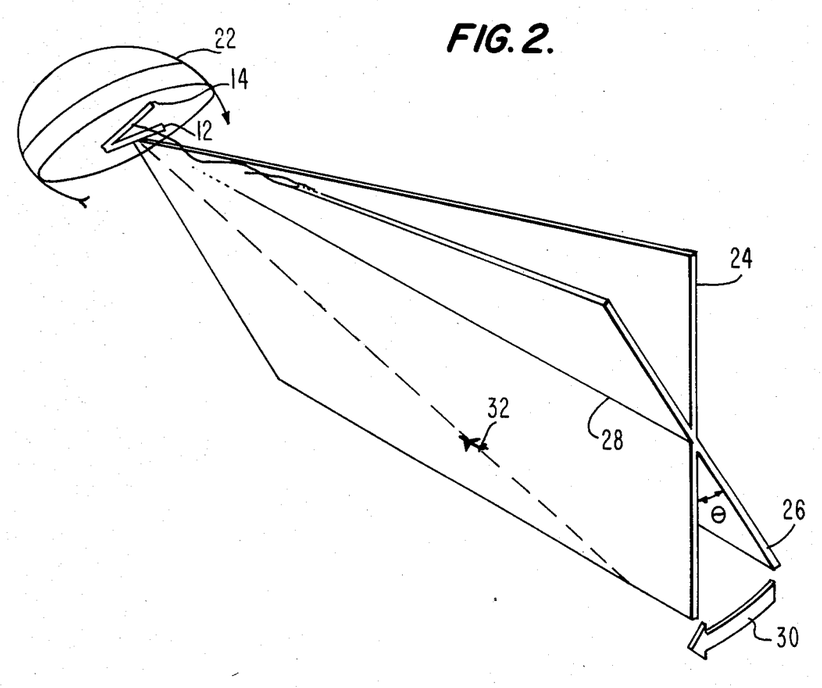
FIG. 2 is a perspective view of an X beam used in accordance with the teachings of the present invention.

Antennas 12 and 14 are preferably mounted in an airborne rotodome 22 as shown in FIG. 2 with antenna 12 defining a vertical plane 24 and antenna 14 definine a skewed plane 26. Planes 24 and 26 intersect one another along a line of intersection 28. Antennas 12 and 14 are located along line of intersection 28. As can be seen from FIGS. 2 and 3, planes 24 and 26 form an X. Although the orientation of line of intersection 28 is optional, it is preferable that line of intersection 28 either be oriented parallel to a line which is tangent to the surface of the earth directly below antennas 12 and 14 or that line 28 be oriented so as to intersect the horizon as seen from antennas 12 and 14.

Figure 3:
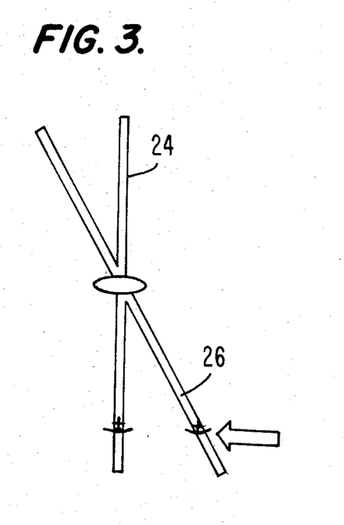
FIG. 3 is an end view of the X beam illustrated in FIG. 2.

Rotor 16 of FIG. 1 is physically connected to antennas 12 and 14 and is capable of imparting a rotation to line of intersection 28 and, therefore, to planes 24 and 26 at a rate of sweep $\tau$. Rate of sweep $\tau$ may, for example, be equal to 36 degrees per second. As shown in FIG. 2, rotor 16 may, for example, impart a clockwise directional rotation to planes 24 and 26 as indicated by arrow 30. Accordingly, as shown in FIG. 3 with such rotation, a target 32 located below line of intersection 28 would first fall within vertical plane 24 and thereafter fall within skewed plane 26.

Figure 4:
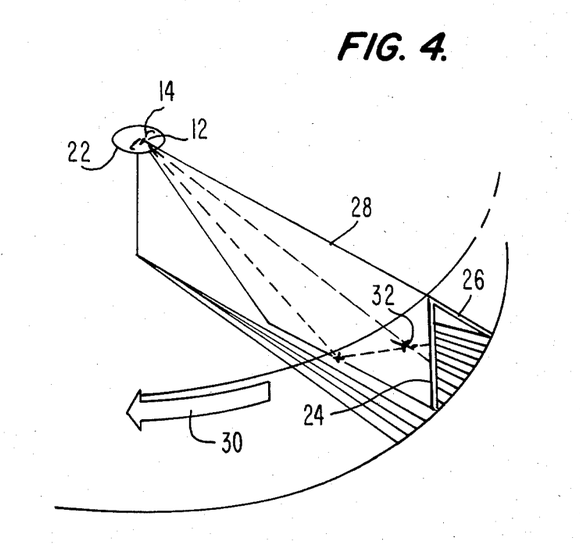
FIG. 4 is another perspective view of a portion of the X beam illustrated in FIG. 2.
Figure 5:
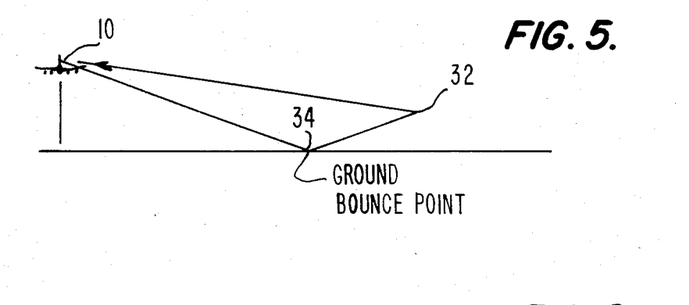
FIG. 5 is a side view of a portion of the X beam illustrated in FIG. 4.
Figure 6:
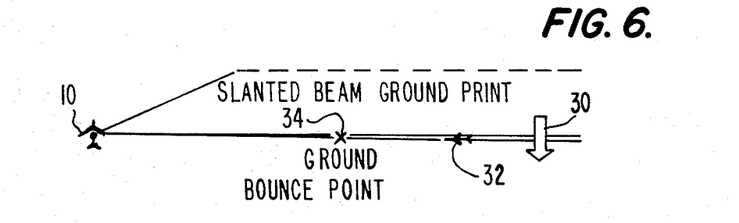
FIG. 6 is a top view of the portion of the X beam illustrated in FIG. 5.
Figure 7:
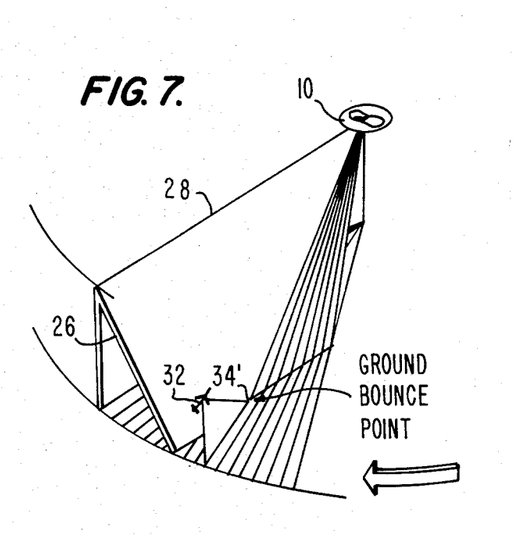
FIG. 7 is still another perspective view of a portion of the X beam illustrated in FIG. 2.
Figure 8:
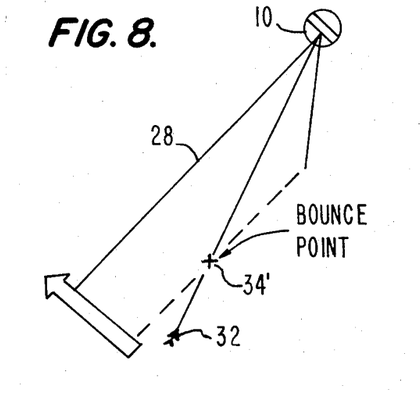
FIG. 8 is a top view of that portion of the X beam illustrated in FIG. 7.
Figure 9:
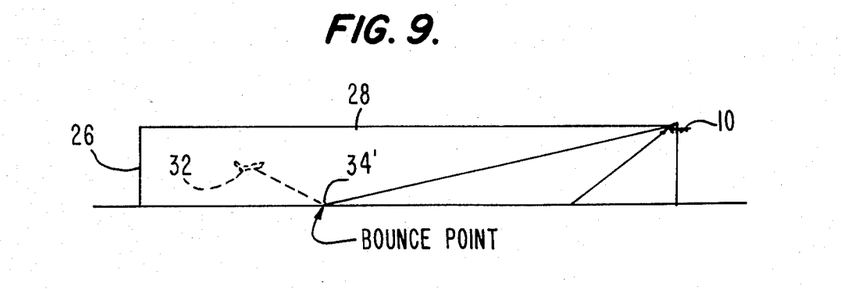
FIG. 9 is a side view of that portion of the X beam illustrated in FIG. 7.

As may be seen in connection with FIGS. 4, 5 and 6, antenna 12 in conjunction with receiver section 18 first receives a direct signal from target 32 when target 32 falls within the confines of plane 24. Shortly thereafter, this signal from target 32 reaches antenna 12 by an indirect or reflected path which includes reflection off the earth at ground bounce point 34. As planes 24 and 26 continue to rotate, target 32 eventually falls within plane 26 and, at that moment, signals from target 26 may be received by antenna 14 and associated receiver section 20. As plane 26 continues to rotate, the ground bounce point 34' for signals from target 32 will fall within plane 26 (FIGS. 7, 8 and 9) and, therefore, be received by antenna 14 and associated receiver section 20. FIGS. 7, 8 and 9 show a perspective, top view, and side view, respectively of ground bounce point 34'.

In accordance with the present invention, means are provided for measuring the delay $T_1$ between the receipt of signals in a first, preferably vertical, plane and then in a second skewed plane directly from a target. In addition, means are provided for measuring the delay $T_2$ between receipt of signals in the first vertical plane and then in the second skewed plane when those signals travel along a path causing the signals to be reflected from a remote surface.

As illustrated in FIG. 1, a cross-correlator 36 is provided which receives signals both from vertical antenna receiver section 18 and skewed receiver switch 20 of receiver 10. As should be well-known to those skilled in the art, a correlator has the capacity to distinguish between superimposed very closely spaced signals and to determine the time delay between receipt of those signals. Accordingly, cross-correlator 36 has the capacity to determine the time of arrival ($T_A$) of a signal received directly from target 32 upon coincidence of target 32 with plane 24; to determine the time of arrival ($T_B$) of a signal from target 32 which passes through ground bounce point 34 upon coincidence of ground bounce point 34 and plane 24; to determine the time of arrival ($T_C$) of a signal directly from target 32 upon coincidence of target 32 and plane 26; and to determine the time of arrival ($T_D$) of a signal from target 32 upon coincidence of a ground bounce point 34' and plane 26. The difference between $T_A$ and $T_C$ is the time delay $T_1$. The difference between $T_B$ and $T_D$ is the time delay $T_2$.

It should be appreciated that ground bounce points 34 and 34' may be effectively the same location if target 32 is moving at a slow rate of speed in comparison to the angular velocity of planes 24 and 26 at ground bounce point locations 34 and 34'.

The system of FIG. 1 further discloses the utilization of a receiver altimeter 38 and a microprocessor 40. Receiver altimeter 38 may be of any standard variety which is capable of determining the instantaneous height $R_H$ of receiver 10. Microprocessor 40 may be of any variety which is capable of calculating the slant range $R_s$ and/or elevation $T_H$ of target 32 in response to the fixed inclination angle $\theta$ between planes 24 and 26, the rate of sweep $\tau$, time delay $T_1$, time delay $T_2$, and receiver height $R_H$ using the relationships:

$$R_S = \frac{2R_H \cdot \cos(\alpha_G)}{\sin(\alpha_G + \alpha_D)} ; \quad (1)$$

$$T_H = R_H - R_S \cdot \sin(\alpha_D); \quad (2)$$

where:

$$\alpha_D = \tan^{-1}[\sin(T_1 \cdot \tau)/\tan(\theta)] \quad (3);$$

and $$\alpha_G = \tan^{-1}[\sin(T_2 \cdot \tau)/\tan(\theta)] \quad (4).$$

It should be understood that the above equations are only approximate and that corrections can be added to account for the curvature of the earth and the like.

In the above equations, $\alpha_D$ represents the depression (elevation) angle formed at receiver 10 by a line at receiver 10 which is parallel to a line which is tangent to the surface of the earth at a point directly below receiver 10 and a line which defines the direct path between receiver 10 and target 32. Angle $\alpha_G$ represents the depression (elevation) angle which is formed at receiver 10 between a line at receiver 10 which is parallel to a line which is tangent to the surface of the earth at a point directly below receiver 10 and a line which interconnects receiver 10 and bounce point 34.

Figure 10:
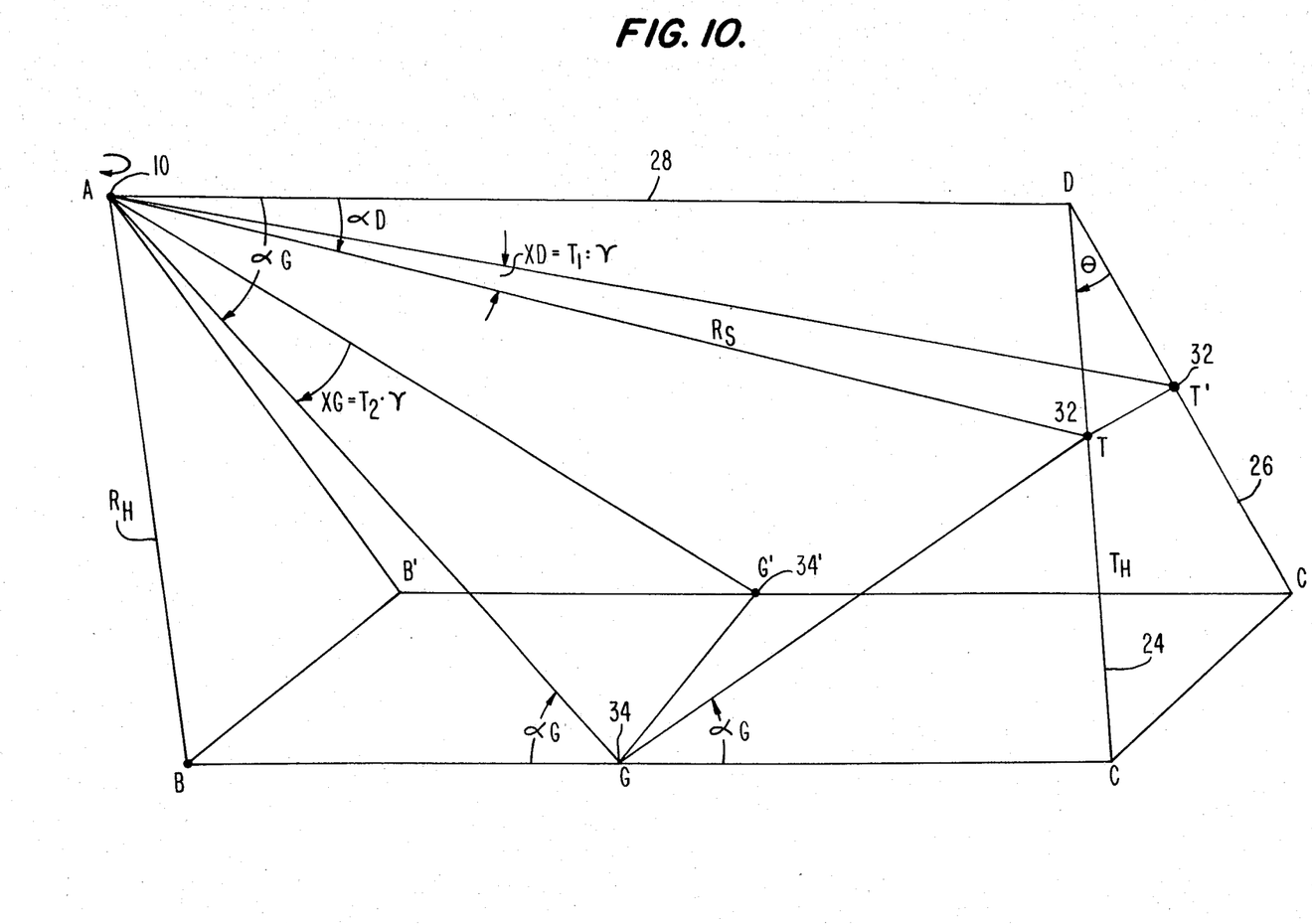
FIG. 10 is a vector diagram which illustrates certain relationships between the depression angles $\alpha_D$ and $\alpha_G$ which are employed in accordance with the teachings of the subject invention.

Angles $\alpha_D$ and $\alpha_G$ may be better understood with reference to FIG. 10 which is an abstract representation of planes 24 and 26. More specifically, in FIG. 10 point A is the theoretical location of receiver 10. Point B is a point on the surface of the earth directly below receiver 10. Line BC is a line tangent to the surface of the earth at point B. Line AD is a line which is parallel to line BC. ABCD defines plane 24 at a point of time in which plane 24 includes point T, which is the location of target 32. Accordingly, line AT is the slant target range $R_S$ between receiver 10 and target 32. Angle $\alpha_D$ is the depression angle formed between line AD and line AT. Point G is the location of ground bounce point 34 within plane 24. Accordingly, line TG is the pre-reflection signal path, line AG is the post-reflection signal path, and angle $\alpha_G$ is the depression angle formed between line AD and line AG.

In FIG. 10, AB'C'D represents plane 26 at a point in time in which target 32 is located within plane 26 at a point $T_1$. Point G' of FIG. 10 is a point which identifies the ground bounce point 34' within plane 26.

In FIG. 10, planes 24 and 26 may be seen to define a tent within which there is a first triangular sliver ATT' which forms depression angle $\alpha_D$ with regard to intersection line AD of planes 24 and 26. Also within the tent is a second triangular sliver AGG' which forms a depression angle $\alpha_G$ with regard to intersection line AD. It should be appreciated from FIG. 10, a particular time period $T_1$ between receipt of a signal in plane 24 and then in plane 26 directly from target 32 uniquely defines the angle $X_D$ at the apex of triangular wedge ATT' ($X_D = T_1 \cdot \tau$). Likewise the time period $T_2$ between receipt of a signal in plane 24 and receipt of a signal in plane 26 which signals are reflected from a remote surface such as the earth at points G,G' uniquely defines angle $X_G$ at the apex of triangular sliver AGG' ($X_G = T_2 \cdot \tau$). Sliver ATT' fits within the tent formed by planes 24 and 26 at a unique direct signal depression angle D and sliver AGG' fits within the tent formed by planes 24 and 26 at a unique ground depression angle $\alpha_G$.

Depression angle $\alpha_D$ may be uniquely determined given $\theta$, $\tau$, $T_1$ and $R_H$, while depression angle $\alpha_D$ may be uniquely determined given $\theta$, $\tau$, $T_2$ and $R_H$ as indicated by the relationships of equation (3) and (4) set forth above. The proof for these relationships is given below in connection with FIG. 11.

Figure 11:
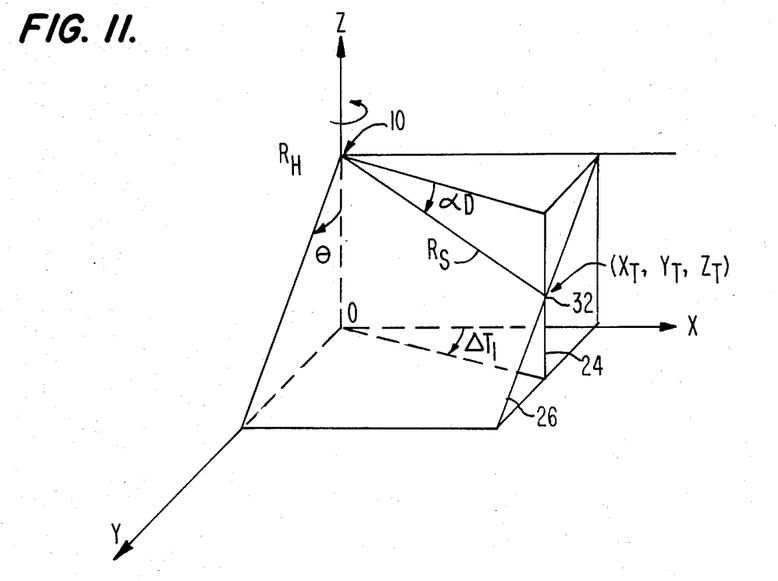
FIG. 11 is a vector diagram which illustrates certain relationships between the planes generated by an antenna system used in accordance with the subject invention.

In FIG. 11 an XYZ coordinate system is illustrated in which receiver 10 is located a distance $R_H$ above the origin along the Z axis. Target 32 is located at a point $X_T, Y_T, Z_T$. Given the X,Y,Z coordinate represented in FIG. 11, the skewed plane 26 may be defined by the mathematical equation:

$$(\cot(\theta) \cdot y) + z = R_H \quad (5).$$

The vertical plane containing a line-of-sight to target 32 may be represented by:

$$(\tan(T_1 \cdot \tau)) \cdot x - y = 0 \quad (6).$$

The line representing the slant target range ($R_S$), namely the direct line-of-sight to the target from receiver 10 is, at one point of time, contained within plane 24 and at a later point of time contained within plane 26. Assuming no effective movement of target 32, these two times are shown to exist in coincidence in FIG. 11 and, accordingly, in FIG. 11 line $R_S$ represents the intersection of plane 24 and 26 and may, therefore, be defined by simultaneous solution of equations (5) and (6) above.

The tangent of the direct depression angle $\alpha_D$ is:

$$\tan(\alpha_D) = [R_S - Z_T]/[\sqrt{X_T^2 + Y_T^2}] \qquad (7)$$

Target 32 lies on the line of sight $R_S$ and, accordingly, the relationships between $X_T$, $Y_T$ and $Z_T$ are given by equations (5) and (6). From equation (5), $R_H - Z_T = [\cot(\theta)] \cdot Y_T$ and from equation (6) $X_T = Y_T/[\tan(T_1 \cdot \tau)]$. By substitution:

$$\tan(\alpha_D) = \frac{[\cot(\theta)] \cdot Y_T}{\sqrt{\frac{Y_T^2}{\tan^2(T_1 \cdot \tau)} + Y_T^2}} \qquad (8)$$

Equation (8) may be solved for $\alpha_D$ as shown in equation (3). Accordingly, the depression angle $\alpha_D$ is a function only of $T_1$ if $\theta$ and $\tau$ are known.

In a similar manner, depression angle $\alpha_G$ may be shown to be a function of only $T_2$ as indicated above in connection with equation (4).

Having established the depression angles $\alpha_G$ and $\alpha_D$, it is a simple geometric operation to determine target height $T_H$. Specifically:

$$T_H = R_H - R_S \cdot \tan(\alpha_D) \qquad (9).$$

Figure 12:
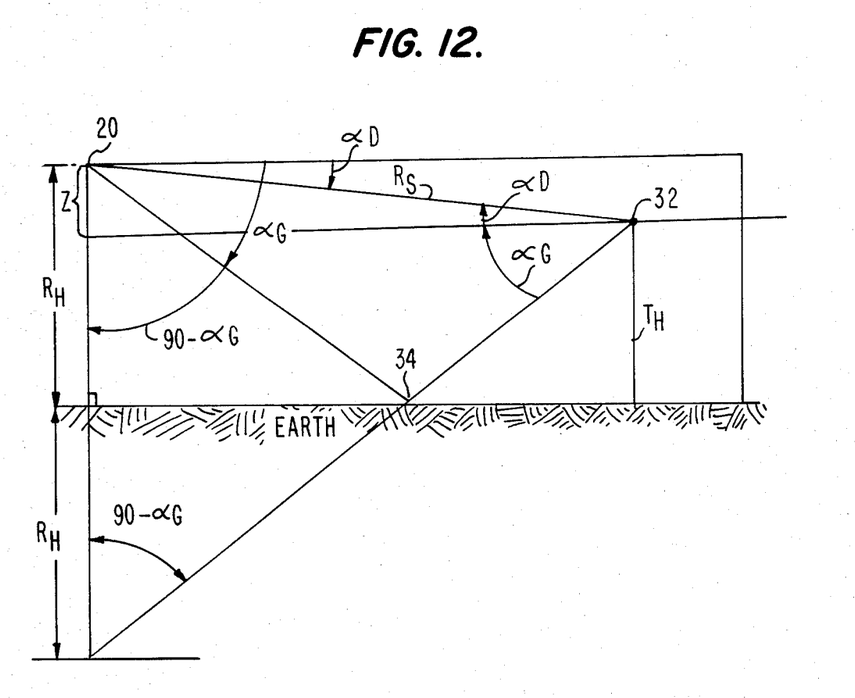
FIG. 12 is a vector diagram which shows the relationships between depression angles $\alpha_D$, $\alpha_G$, receiver height $R_H$, and target height $T_H$.

This relationship can be established by reference to FIG. 12 from which it may be seen that by applying the law of sins:

$$\frac{2R_H}{\sin(\alpha_D + \alpha_G)} = \frac{R_S}{\sin(90 - \alpha_G)} \qquad (10)$$

A solution of this equation (10) for $R_S$ reveals that:

$$R_S = [2R_H \cdot \cos(\alpha_G)]/[\sin(\alpha_D + \alpha_G)] \qquad (11).$$

With reference to FIG. 11, it may be seen that $T_H$ equals $R_H - z$ and $z = R_S \cdot \tan(\alpha_D)$. Accordingly:

$$T_H = R_H - R_S \cdot \tan(\alpha_D) \qquad (12).$$

In summary, when antennas 12 and 14 of receiver 10 shown in FIG. 1 are rotated in a clockwise direction, as shown in FIG. 2 the direct signal path and the bounced signal path will be received in the vertical antenna receiver section 18 first. Later, the direct emitted signal will be received by the skewed antenna receiver section 20 and, finally, the skewed antenna receiver section 20 will receive the weaker delayed bounce signal. The time delay between these signals taken in the context of antenna rotation rate $\tau$ and antenna offset $\theta$ provides a basis for computing the direct and reflected depression angles $\alpha_D$ and $\alpha_G$ of the target. From these time measurements, which can be measured precisely, depression angles can be derived which are very difficult to measure directly to the accuracies required for sophisticated tracking applications.

As established above, since (i) the depression angle to the target and the depression angle to the ground bounce point are known, and (ii) it is known that the target emitter is located along the same azimuth and at an elevation equal and opposite to the direction of arrival of the ground bounced signal, calculation of the emitter target location can be determined by establishing the intersection of the direct signal path and the pre-reflection signal path. Accordingly, the system and methods of the subject invention provide an unambiguous target emitter location without employing standard time delay of arrival data.

Additional advantages and modifications will readily occur to those skilled in the art. The invention, in its broader aspects is, therefore, not limited to the specific details, representative apparatus and illustrative examples shown and described. Accordingly, departures may be made from such detail without departing from the spirit or scope of applicant's general inventive concept.

I claim:

1. A system for detecting the range and elevation of a target comprising:
   a. an antenna system having first and second planes of receipt which are inclined a fixed angle ($\theta$) from one another, said antenna system being located along the line of intersection of said planes and said antenna system including means for sweeping said line of interesection at a known rate of sweep ($\tau$);
   b. means for measuring the delay ($T_1$) between receipt of signals in said first and then in said second planes which are emitted from a target and received directly by said antenna system;
   c. means for measuring the delay ($T_2$) between receipt of signals in said first and then in said second planes which are emitted by said target and received by said antenna system after being reflected from a remote surface;
   d. means for measuring the height ($R_H$) of said receiver; and
   e. means for calculating the range and/or elevation of said target in response to $\theta$, $\tau$, $T_1$, $T_2$ and $R_H$.

2. The system of claim 1 wherein said means for calculating determines slant target range $R_S$ using the relationship:

$$R_S = \frac{2R_H \cdot \cos(\alpha_G)}{\sin(\alpha_G + \alpha_D)};$$

where:

$$\alpha_D = \tan^{-1}[\sin(T_1 \cdot \tau)/\tan(\theta)];$$

and $$\alpha_G = \tan^{-1}[\sin(T_2 \cdot \tau)/\tan(\theta)].$$

3. The system of claim 1 wherein said means for calculating determines target elevation $T_H$ using the relationship:

$$T_H = R_H - R_S \cdot \sin(\alpha_D)$$

where:

$$R_S = \frac{2R_H \cdot \cos(\alpha_G)}{\sin(\alpha_G + \alpha_D)} \ ;$$

$$\alpha_D = \tan^{-1}[\sin(T_1 \cdot \tau)/\tan(\theta)]; \text{ and}$$

$$\alpha_G = \tan^{-1}[\sin(T_2 \cdot \tau)/\tan(\theta)].$$

4. The system of claim 2 wherein said means for calculating determines target elevation $T_H$ using the relationship:

$$T_H = R_H - R_S \cdot \sin(\alpha_D)$$

5. The system of any one of claims 1 to 4 wherein said line of intersection is parallel to a line which is tangent to the surface of the earth at a point directly below said antenna system.

6. The system of any one of claims 1 to 4 wherein said line of intersection also intersects the horizon as seen from said antenna system.

7. A method for detecting the range and elevation of a target employing an antenna system having first and second planes of receipt which are inclined a fixed angle ($\theta$) from one another, said antenna system being located along the line of intersection of said planes and said antenna system including means for sweeping said line of intersection at a known rate of sweep ($\tau$), the method comprising the steps of:
  a. measuring the delay ($T_1$) between receipt of signals in said first and then in said second planes which are emitted from a target and received directly by said antenna system;
  b. measuring the delay ($T_2$) between receipt of signals is said first and then in said second planes which are emitted by said target and received by said antenna system after being reflected from a remote surface;
  c. measuring the height ($R_H$) of said receiver; and
  d. calculating the range and/or elevation of said target in response to $\theta$, $\tau$, $T_1$, $T_2$ and $R_H$.

8. The method of claim 7 wherein said step of calculating includes determining the slant target range $R_S$ using the relationship:

$$R_S = \frac{2R_H \cdot \cos(\alpha_G)}{\sin(\alpha_G + \alpha_D)} \ ;$$

where:

$$\alpha_D = \tan^{-1}[\sin(T_1 \cdot \tau)/\tan(\theta)];$$

and $$\alpha_G = \tan^{-1}[\sin(T_2 \cdot \tau)/\tan(\theta)].$$

9. The method of claim 7 wherein said step of calculating includes determining the target elevation $T_H$ using the relationship:

$$T_H = R_H - R_S \cdot \sin(\alpha_D)$$

where:

$$R_S = \frac{2R_H \cdot \cos(\alpha_G)}{\sin(\alpha_G + \alpha_D)} \ ;$$

$$\alpha_D = \tan^{-1}[\sin(T_1 \cdot \tau)/\tan(\theta)]; \text{ and}$$

$$\alpha_G = \tan^{-1}[\sin(T_2 \cdot \tau)/\tan(\theta)].$$

10. The method of claim 8 wherein said step of calculating includes determining said target elevation $T_H$ using the relationship:

$$T_H = R_H - R_S \cdot \sin(\alpha_D).$$

* * * * *